Nov. 22, 1927.
W. HUCKS
1,650,516
APPARATUS FOR AERATING LIQUIDS
Filed April 8, 1927     4 Sheets-Sheet 3
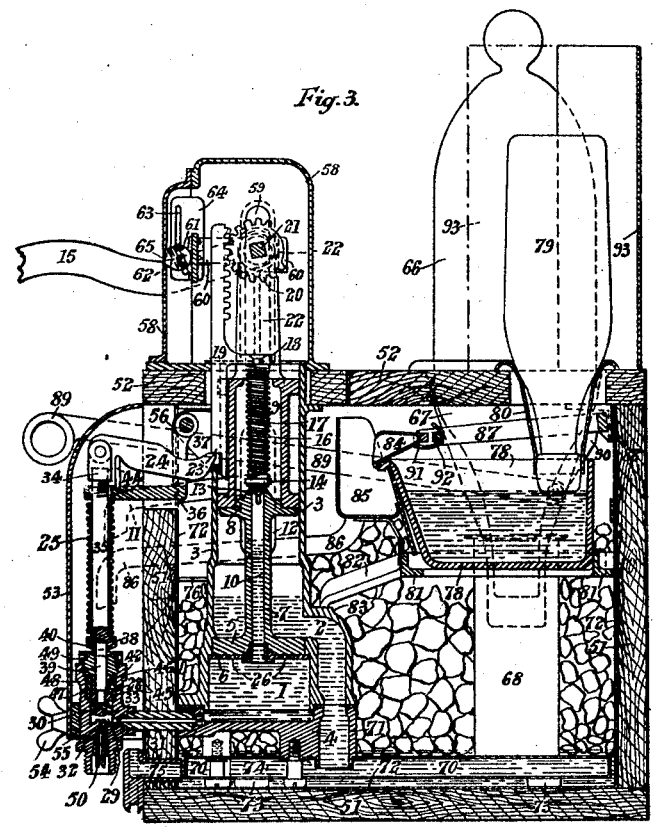
INVENTOR
WILLIAM HUCKS
BY HIS ATTORNEYS

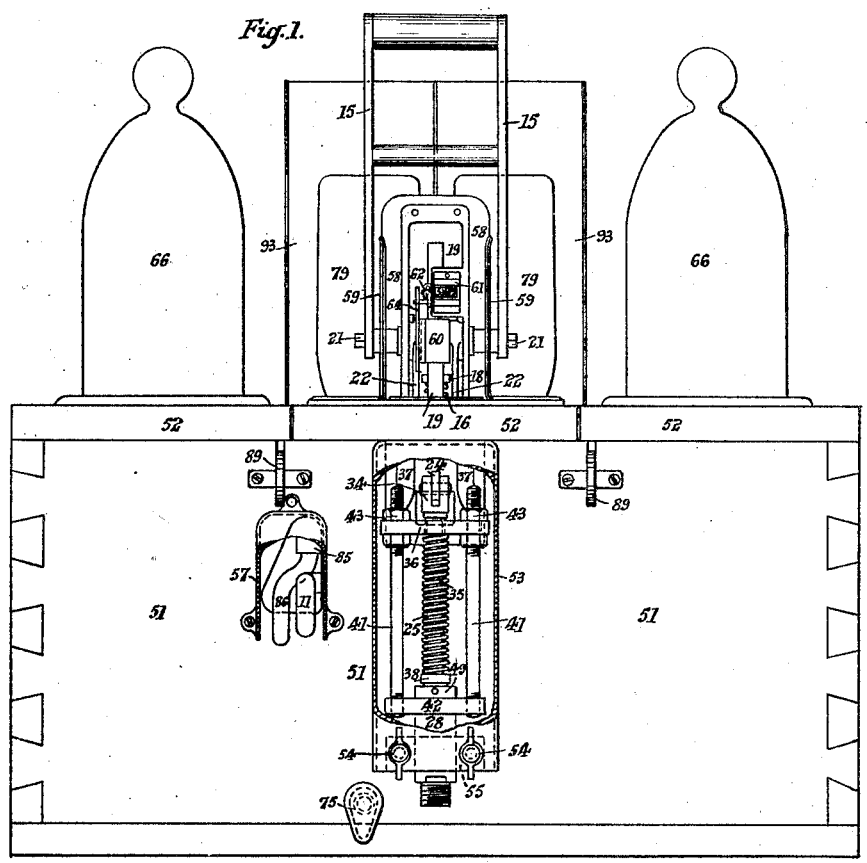

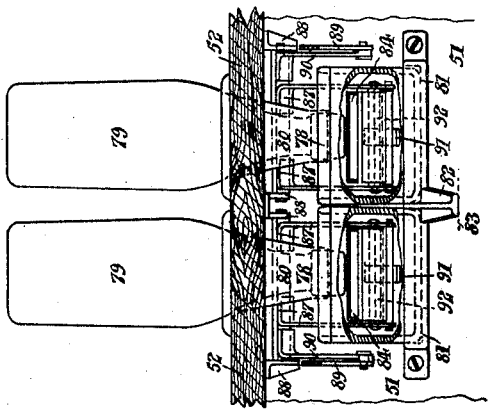

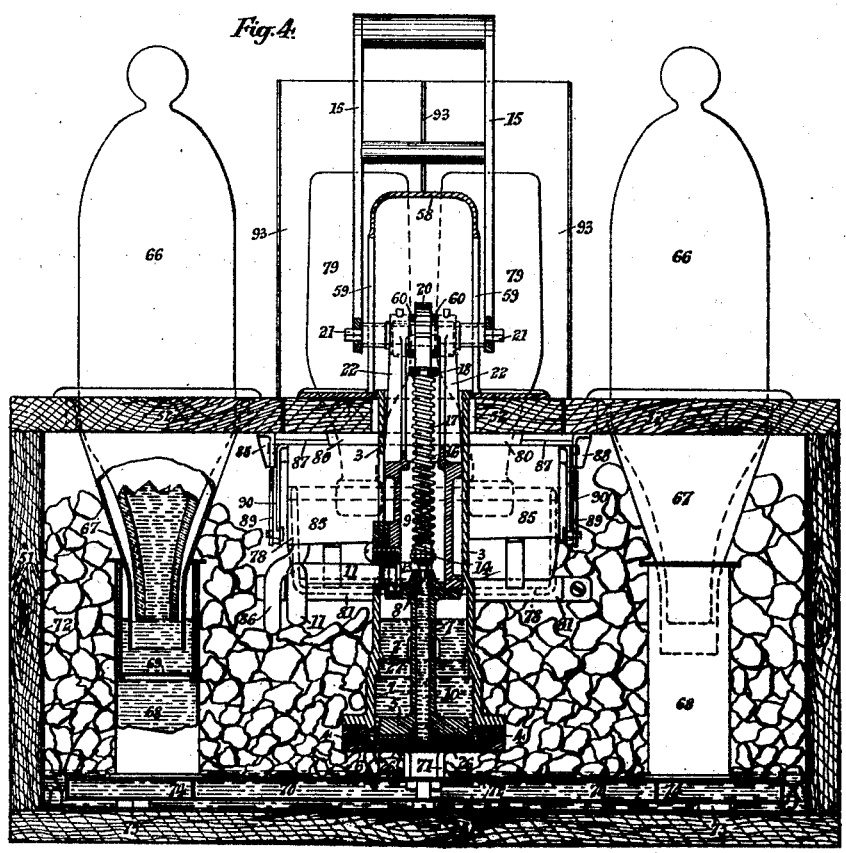

Patented Nov. 22, 1927.

1,650,516

UNITED STATES PATENT OFFICE.

WILLIAM HUCKS, OF CAMDEN TOWN, LONDON, ENGLAND, ASSIGNOR OF ONE-HALF TO SODASTREAM LIMITED, OF LONDON, ENGLAND.

APPARATUS FOR AERATING LIQUIDS.

Application filed April 8, 1927, Serial No. 182,034, and in Great Britain January 28, 1927.

This invention relates to apparatus for aerating water, or other liquid, in small quantities at a time, the said apparatus being of the kind shewn and described in the specification of United States Letters Patent No. 1,623,011 granted to me on March 29, 1927. This apparatus comprises a receptacle for containing the water, or other liquid (hereinafter referred to as the liquid) to be aerated which is closed at the bottom and has an inlet opening, at a suitable height from the said bottom, through which liquid is to be aerated is admitted to the said receptacle, a piston-like body within the said aerating receptacle and having an axial passage therethrough, a discharge vessel secured to and reciprocal with the said piston-like body, a combined discharge and safety valve situated in the said discharge vessel and adapted to control the outlet of the said axial passage, and means for admitting gas under pressure into the said aerating receptacle. The said apparatus also comprises hand-operable means adapted to cause, at the proper times, the said piston-like body to ascend through the liquid in the said aerating receptacle and close the upper end thereof, and to cause the said combined discharge and safety valve to close the outlet of the axial passage through the piston-like body and after aeration of the liquid confined in the said aerating receptacle has been effected, to cause the said combined discharge and safety valve to open the outlet of the said axial passage and cause, or permit, the said piston-like body to descend and expel the aerated liquid through the said axial passage into the said discharge vessel from which it passes through an outlet spout into a receptacle placed in position to receive it.

In apparatus of the aforesaid kind the aeration of the liquid is effected by an operator opening valve of a gas container in communication with the interior of the aerating receptacle whereby gas under pressure is admitted beneath the piston-like body into the said receptacle, this operation being separate and distinct from that effected by the aforesaid hand-operable means.

This invention has for its object to provide an improved apparatus of the aforesaid kind wherein the hand-operable means besides effecting the operations as hitherto also causes the aeration of the liquid to be effected, and mainly consists in providing the apparatus with a valve which controls communication between a gas container and the interior of the aerating receptacle and means whereby the said valve is caused to be opened and closed, at the proper times, by the hand-operable means so that by a movement in one direction and a return movement of the said hand-operable means, the aeration and discharge of the liquid is effected. If desired the apparatus may be provided with means for introducing a flavouring liquid into the glass, or other container, placed in position to receive the aerated liquid discharged from the apparatus and also, if desired, improved means may be provided for cooling, or maintaining cool, the liquid contained in a reservoir from which the liquid to be aerated is drawn.

I will describe this invention with reference to the accompanying drawings which illustrate an apparatus constructed in accordance therewith but the invention is not limited to the precise details of construction hereinafter described.

Figure 1 is a front elevation, with parts broken away. Figures 2 and 3 are sections at right angles to Figure 1, Figure 2 shewing the parts in the position when the piston is at the bottom of its stroke and the port, or channel, through which gas under pressure is admitted to the apparatus closed by its controlling valve and Figure 3 shewing the parts in the position when the said piston is at the top of its stroke and the said port, or channel, open. Figure 4 is a longitudinal section, the parts being in the position shewn in Figure 2 and Figure 5 is a front elevation, with parts broken away, of means for introducing a flavouring liquid into the glass, or other container, placed in position to receive the aerated liquid discharged from the apparatus.

The apparatus according to this invention comprises a cylindrical aerating receptacle 1 which is closed at the bottom and has an inlet 2 at a suitable height from the said bottom through which the liquid is admitted into the said aerating apparatus. The aerating receptacle is provided with an upwardly extending cylindrical part 3 which constitutes a housing for parts hereinafter described and the said receptacle is supported on and secured to a base-piece 4 which constitutes a closure for the bottom of the said receptacle. The aerating receptacle 1 has a piston-like body reciprocal therein consisting of a plunger 5 which is smaller in diameter than the internal diameter of the part of the receptacle in which the said plunger reciprocates, the space between being covered by a flexible valve 6 opening downwards as described in the specification of the British Letters Patent No. 229733. Extending upwardly from the plunger 5 is a stem 7 having a head, or flange, 8 which constitutes a closure for the lower end of a discharge vessel 9 secured to the said head, or flange, so that it reciprocates with the said plunger. Extending axially through the plunger 5, stem 7 and head, or flange, 8 is a passage 10 through which the aerated liquid is expelled upon the descent of the said plunger, into the discharge vessel 9 from which it passes through an outlet spout 11 into a glass, or other container, placed in position to receive it. The discharge vessel 9 is housed and guided in the upward extending part 3 of the aerating receptacle 1 and the said part has a suitably shaped slot 12 formed therein through which the outlet spout 11 projects. The outlet 13 of the passage 10 is controlled by a combined discharge and safety valve 14 which is connected to an operating hand-lever 15 by means such that will permit the said valve to open the said outlet when a predetermined pressure is reached within the aerating receptacle 1 and will cause the said valve to open and close the said outlet at the proper times. This is effected by attaching the valve 14 to the lower end of a spring 16 the upper end of which is secured, through a guide rod 17, to an inwardly projecting piece 18 formed on a rack-bar 19 with which engages a tooth pinion 20 secured to a shaft 21 rotatably mounted in bearing brackets 22 secured to, or formed in one with, the upper end of the discharge vessel 9, to which shaft the operating hand-lever 15 is secured.

Presuming the plunger 5 to be bearing upon the flat bottom of the aerating receptacle 1 as shewn in Figure 2 and 4 and that the said receptacle has been charged with liquid to be aerated the operation of the apparatus is as follows:— Upon turning the hand-lever 15 in the direction of the arrow, shewn in Figure 2, the tooth pinion 20 moves the rack-bar 19 downwardly thereby causing the combined discharge and safety valve 14 to be moved towards its seat until further downward movement of the said rack-bar is prevented by a part 23 thereof engaging an abutment constituted by a lever 24 (hereinafter more particularly described) normally held stationary by the action of a spring 25. As the rack-bar 19 can not now be moved downwardly, further movement of the hand-lever 15 in the same direction causes the tooth pinion 20 to act as a lever, the engaging teeth constituting the fulcrum, so that the shaft 21 is raised and consequently the discharge vessel 9 and the plunger 5 attached thereto are raised relatively to the combined discharge and safety valve 14 to close the outlet 13 of the passage 10 which closure is, however, not completely effected until the plunger 5 has been raised slightly from the bottom of the aerating receptacle 1 thereby overcoming suction effect which would occur if the said plunger were raised after ingress of air had been shut off by the closure of the said passage. To assist in overcoming the aforesaid suction effect the flexible valve may have holes 26 through it. When by the movement of the hand-lever 15 the plunger 5 has been raised from the flat bottom 4 of the aerating receptacle 1 and the outlet 13 of the passage 10 has been moved up against the combined discharge and safety valve 14, thereby stopping further ingress of air through the said passage 10 to the underside of the plunger 5, further movement of the said hand-lever, in the same direction, will then simultaneously compress the spring 16 and lift the discharge vessel 9 and all parts connected thereto including the combined discharge and safety valve 14 and plunger 5 until the said plunger is seated against an internal flange, or constriction, 27 at the upper end of the said aerating receptacle. Upon further movement of the hand-lever 15, in the same direction, gas under pressure is admitted to the interior of the aerating receptacle 1. This is shewn as being effected as follows:— Adapted to be screwed, or otherwise attached, to the outlet of a gas container (not shewn) is a valve-casing 28 having a valve-chamber 29 within which is a valve 30 which controls the inlet of gas into the said chamber. A tubular piece 31, the ends of which fit gas-tightly into holes formed in the valve-casing 28 and base-piece 4, respectively, effects communication between the interior of the valve-chamber 29 and the interior of the aerating receptacle 1. The valve 30 slidably fits within the valve-chamber 29 and is normally held down by the before mentioned spring 25 and closes a port, or channel, 32 through which the gas under pressure passes into the said valve-chamber. The valve 30 may be provided with a renewable seating 33 of hard vulcanite, or other suitable material. The lever 24 is pivotally mounted in a forked piece 34 screwed onto the upper end of a rod 35 slidable through a hole in a plate 36, pivotally supported on brackets 37 secured to, or formed in one with, the upwardly extending cylindrical part 3. The spring 25, under compression, surrounds the rod 35 and bears on the underside of the plate 36 and the upper side of a collar, or enlargement, 38 on the lower end of the said rod and the pressure of the said spring is transmitted to the valve 30, to hold it in its normal, or closed, position, by a rod 39 the upper end of which enters a hole 40 in the said collar, or enlargement, 38 and the lower end of which bears upon the upper side of the said valve. The spring 25 may be compressed by any suitable means, for example, this may be effected as shewn in Figure 1 by rods 41 screwed at their lower ends into a flange 42 formed on the valve-casing 28 the upper ends of the said rods being screw-threaded and passed through holes in the plate 36 and having nuts 43 screwed thereon so that by screwing down the said nuts the said spring can be compressed sufficiently to transmit, through the rods 35 and 39, such pressure on the top of the valve 30 that it prevents the said valve being raised by the pressure of the gas on its under side. The strength of the spring 25 is also such that it prevents movement of the lever 24 when it constitutes the abutment for the rack-bar 19 while the plunger is being raised, as aforesaid, but when the plunger 5 is in contact with the internal flange, or constriction, 27 further movement of the hand-lever 15 will, through the said rack-bar, cause the said lever to turn on its fulcrum, constituted by a post 44 interposed between the said lever and the plate 36, and raise the rod 35 in opposition to the action of the said spring, thereby relieving the rod 39 of pressure so that the pressure of the gas will now act to force the valve 30 and the said rod 39 upwardly and consequently the gas will pass through the port, or channel, 32 into the valve-chamber 29 and from thence through the tubular piece 31 into the receptacle 1 and aerate the liquid therein. The position of the parts will now be that shewn in Figure 3. Any suitable means may be provided for preventing leakage of gas from the aforesaid valvular device. This is shewn as being effected by a suitably shaped tubular piece of rubber 45 fitted onto a part of reduced diameter of the rod 39 the said piece of rubber having a flange, or collar, which closely fits against a flanged bush, or collar, 46 through which the valve rod passes out of the valve-chamber 29. Any gas leaking past the valve 30 will act to force the rubber piece 45 more tightly against the bush, or collar, 46. As a precaution against leakage of gas between the flanged bush, or collar, 46 and the wall of the valve-chamber 29, the flange of the said bush, or collar, fits within, and bears upon the bottom of, an orifice of larger diameter than that of the valve-chamber 29 of which it is an extension. A rubber ring, or other suitable packing, 47 surrounds that part of the bush or collar, 46 extending above the flange, and this rubber ring, or other packing, is pressed tightly against the wall of the orifice by another collar 48 superposed upon the said rubber ring, or other packing, 47 the said collar 48 being pressed downwardly by a gland 49 (through which the rod 39 passes) screwed into the upper end of the valve-casing. The gas in its passage from the gas container to the port, or channel, 32 preferably passes through a finely perforated tube 50 screwed into a hole beneath the said port, or channel. The pressure of the gas admitted into the aerating receptacle 1 acts upon the flexible valve 6 on the underside of the plunger 5 and ensures a gas-tight closure at the top of the said receptacle. When the pressure in the aerating receptacle 1 exceeds a predetermined amount the spring 16 of the combined discharge and safety valve 14 will yield sufficiently to allow the excess pressure to escape.

Upon turning the hand-lever 15 in the reverse direction the rack-bar 19 is raised, by the tooth pinion 20, thereby freeing the lever 24 so that by the action of the spring 25 the valve 30 is again forced downwardly and closes the port or channel, 32. The upward movement of the rack-bar 19 also permits the spring 16 of the combined discharge and safety valve 14 to extend sufficiently to permit of the escape of any gas that may not have been absorbed by the liquid and further upward movement of the said rack-bar will lift the said valve off its seating to permit of the discharge of the aerated liquid which discharge is effected by applying a downward pressure to the plunger 5 through the hand-lever 15 whereby the liquid beneath the plunger is forced by the descent of the said plunger through the passage 10 into the discharge vessel 9 above from which it passes through the outlet spout 11 into a glass, or other container, placed in position to receive it.

The greater portion of the apparatus may be enclosed in a wooden box 51, preferably as shewn, the lid, or cover, 52 of which is made in parts hinged thereto so that access can be had to the parts within the said box. The lever 24 and the plate 36 supporting the gas valve-casing 28 project through an opening in the adjacent side of the box 51 so that the said valve-casing and parts associate therewith are on the outside of the said box, the tubular piece 31 conducting the gas to the aerating receptacle 1 passing through a hole in the said side of the box. The aforesaid parts may be enclosed by a metal cover, or guard, 53, as shewn, secured by bolts 54, preferably provided with winged heads, which pass through the said cover, a piece 55 secured thereto and bearing on the valve-casing 28, then through holes in the side of the box 51 and screw into the base-piece 4. The bolts 54 act to secure the base-piece 4, the tubular piece 31 and the valve-casing 28 together in such manner that a gas-tight connection of the said parts is ensured, and the said bolts also act to prevent any tendency for the plate 36 to turn outwardly on its supporting pin 56 due to pressure exerted by the rack-bar 19 on the lever 24. By removing the bolts 54 and cover 53 the plate 36, together with the parts carried thereby, can be turned on the pin 56 so that access can be had to the tubular piece 31 which may be removed for cleaning or for any other required purpose. The outlet pipe 11 from the discharge vessel 9 projects through another aperture in the aforesaid side of the box 51, the said aperture being of a length such that it will permit of the ascending and descending movements of the said pipe. A metal cover, or guard, 57 may, if desired, be secured over the outwardly projecting ends of the pipes 11 and 86. The upper part of the bearing brackets 22 carrying the shaft 21 with the tooth pinion 20 thereon and the upper part of the rack-bar 19 project through an aperture in the lid of the box 51 and these parts are preferably enclosed, as shewn by a metal cover 58 (which may as shewn be made in two parts) secured to the said lid. The ends of the shaft 21 to which the operating hand-lever 15 is secured project through slots 59 in the cover 58 of such length that they will permit of the ascending and descending movements of the said shaft.

The upper part of the rack-bar 19 is guided and maintained in engagement with the tooth pinion 20 by a straddle-piece 60 the leg portions of which are secured to the bearing brackets 22.

If desired, a counting device may be provided to indicate the number of operations, or the amount of liquid treated and drawn off, the said device being operated by any suitable moving part of the apparatus. This is shewn, by way of example, as being effected by securing a counting device 61 to the cover 58, the said counting device having a cranked operating arm 62 which engages with a cam-shaped slot 63 in a plate secured to the straddle-piece 60 so that at each upward, or downward movement of the bearing brackets 22 the said counter will be operated. A suitable aperture 65 is formed in the cover 58 through which the recording numerals of the counting device can be seen.

The liquid to be aerated may be supplied to the aerating receptacle 1 from an inverted bottle, or inverted bottles, 66 adapted to maintain the liquid in the said receptacle at a predetermined level. The inverted bottles 66 are shewn supported in funnel-shaped holders 67 which project downwardly through holes formed in the lid 52 towards the opposite ends thereof. The lower end of each of the holders 67 also projects into the upper end of a tubular piece 68 (preferably provided with a strainer 69, as shewn in Figure 4) in communication with a closed shallow tank 70 at the bottom of the interior of the box 51 into which tank a hollow extension 71 of the base-plate 4 projects and constitutes a continuation of the inlet 2 of the aerating receptacle 1, so that the liquid to be aerated passes from the bottles 66 into the tubular pieces 68, from thence into the closed shallow tank 70, then up the extension 71 and inlet 2 into the said aerating receptacle where it rises to a height level with the outlet end of the said inverted bottles.

If desired the apparatus may be provided with a medium (such for example as ice) for cooling the liquid to be aerated. For this purpose the interior of the box 51 is preferably lined with metal 72 and a suitable amount of broken ice is introduced therein which will act to maintain the closed tank 70, and other parts of the apparatus, cool. The tank 70 is provided with feet 73 so that the said tank will in normal conditions be submerged in cold water produced from the melting ice and the liquid in the tank will thereby be efficiently cooled. Baffles, such as 74, may be provided in the tank 70 so that the liquid therein will be constrained to flow in a circuitous path from the inlet to the outlet thereof. The box 51 may be provided with any suitable water outlet, such for example as the outlet 75 through which the water can pass when it has reached a predetermined height above the closed tank 70. A suitably shaped guard 76 may be secured to the upwardly extending cylindrical part 3 which is adapted to prevent ice obstructing the downward movement of the outlet spout 11 through which the aerated liquid is discharged.

If desired the apparatus may be provided with means for delivering a flavouring liquid (hereinafter referred to as the flavouring syrup) into the glass, or other container, into which the discharged aerated liquid is to be, or has been, received. This may be effected by providing a tank, or tanks, 78 within the box 51 for containing the flavouring syrup which may be supplied from an inverted bottle, or bottles, 79 supported in a funnel-shaped holder, or holders, 80, projecting through a hole, or holes, in the lid 52 of the said box, the height of the outlet of the said bottle, or bottles, determining the height of the syrup in the said tank, or tanks, in the manner well known. The tank, or tanks, 78 is, or are, preferably removably carried by a bracket 81 secured at its rear part to the interior of the box 51 and having at its forward part a projection 82 which bears on a shoulder 83 formed on the cylindrical extension 3 of the aerating receptacle 1. Movable within the tank, or each of the tanks, 78 is a ladle 84 by means of which a predetermined quantity of the syrup can be conveyed therefrom to a hopper 85 secured within the box 51 in proximity to the forward part of the said tank, or tanks, from which hopper the syrup then flows through a pipe 86 into the glass, or other container, into which the aerated liquid has been discharged or into which the said liquid is to be discharged. The ladle 84 is pivotally carried by an oscillatory frame 87 pivotally mounted on brackets 88 secured to the underside of the lid 52 of the box 51 at, or towards, the rear part thereof, which frame can be oscillated as required by a hand-operable lever 89 the forward end of which projects through an opening in the front side of the said box and the rear end of the said lever being pivotally connected to a lever 90 secured to, or formed in one with, the said frame. The ladle 84 when in its normal position is above the level of the syrup in the tank 78 and bears at its forward top edge against the rim of the forward side of the said tank as shown in Figure 3. By pushing the hand-lever 89 inwardly the frame 87 is turned on its bearings, thereby lowering the ladle 84 into the tank to the limit of the inward movement of the said hand-lever as shown in Figure 2 whereupon, by pulling the said hand-lever out to its original position, the said ladle is raised, and in consequence turns on its pivot and discharges its contents into the hopper 85. If desired a stop 91 may be provided on a transverse member 92 of the frame 87 which is adapted to limit the turning movement of the ladle 84 on the said frame.

A guard, or shield, 93 may, if desired, be secured to the lid 52 of the box 51 to protect the bottle, or bottles, 79 containing the syrup and this guard, or shield, may be adapted to constitute an abutment to limit the rearward movement of the hand-operating lever 15.

It is to be understood that the invention is not limited to the precise construction or arrangement of the parts hereinbefore referred to as modifications may be made without departing from the scope of the invention.

What I claim is:—

1. In apparatus for use in aerating liquids comprising an aerating receptacle closed at the bottom and having an inlet opening at a suitable height therefrom through which liquid to be aerated is admitted to the receptacle, a piston-like body reciprocable within the aerating receptacle, having an axial passage therethrough, means for operating said piston-like body, a discharge vessel secured to and reciprocable with said piston-like body, and a combined discharge and safety valve situated in said discharge vessel adapted to control the oulet of said axial passage, in combination with a valve controlling communication between a gas container and the interior of said aerating receptacle, and means actuated by said means for operating the piston-like body whereby said valve is opened and closed at the proper times, said means for operating the piston-like body being adapted by movement in one direction and a return movement to effect the aeration and discharge of the liquid.

2. In apparatus for use in aerating liquids having a valve controlling communication between a gas container and the interior of the aerating receptacle according to claim 1, means adapted to cause the valve to open and close at the proper times, said means comprising a spring-pressed rod adapted to press the valve onto its seating and a lever having one end connected to the upper end of said spring-pressed rod, in combination with a rack-bar in whose path the other end of said lever is disposed, a toothed pinion adapted to reciprocate said rack bar, and a hand lever for rotating said toothed pinion, the whole being adapted, upon completion of the upward movement of the piston-like body in the aerating receptacle, to permit the valve to be raised off its seating by the pressure of the gas beneath, substantially as described.

In testimony whereof I have signed my name to this specification.

WILLIAM HUCKS.